Nov. 22, 1966  E. W. HARTSHORNE  3,286,734
THREE WAY PRESSURE CONTROL SERVO VALVE
Filed Nov. 16, 1964  2 Sheets-Sheet 1

INVENTOR.
EVERETT W. HARTSHORNE
BY
J.B. Holden
ATTORNEY

INVENTOR.
EVERETT W. HARTSHORNE
BY
J.B. Holden
ATTORNEY

United States Patent Office 3,286,734
Patented Nov. 22, 1966

1

3,286,734
THREE WAY PRESSURE CONTROL SERVO VALVE
Everett W. Hartshorne, Akron, Ohio, assignor to The Goodyear Tire & Rubber Company, Akron, Ohio, a corporation of Ohio
Filed Nov. 16, 1964, Ser. No. 411,515
8 Claims. (Cl. 137—625.64)

This invention relates to a three way pressure control valve, and more particularly to a pressure control valve adaptable to a hydraulic braking system which valve utilizes anti-skid input information to control the input pressure to the braking system to eliminate any possible skid condition.

Heretofore, it has been well known to utilize servo valves controlled by electrical systems from anti-skid apparatus. Various skid warning systems are shown in Patent Nos. 2,930,026 and 2,927,302 while an electrical circuit for an anti-skid system is shown in Patent No. 2,980,369 and a brake pressure control anti-skid system is shown in Patent No. 3,034,836. However, generally with these systems, the transmission of the information to the brake for controlling the braking pressure has been slow in reaction thereby neither positively preventing wheel skidding nor insuring shortest possible stopping distance. Further, the apparatus of the present art is expensive and complicated. For example, Patent No. 2,944,772 discloses a complicated apparatus for modulating brake pressure. The present invention may be adaptable to replace a solenoid valve 20 as shown and described in Patent No. 2,799,462.

Therefore, it is the general object of the present invention to avoid and overcome the foregoing and other difficulties of prior art practices by providing a control valve which will improve the braking efficiency of anti-skid control systems by having the valve quickly and accurately controlled by a direct electrical signal from a skid detector and amplifier.

Another object of the invention is to provide a pressure control servo valve comprising two stages wherein the second stage is controlled by the first stage and all first stage orifices for passing hydraulic fluid are variable, and self cleaning by the nature of the construction.

Another object of the invention is to provide a pressure control servo valve wherein the hydraulic fluid flow through the first stage is as small as possible throughout the full range of pressure control so as to decrease the possibility of first stage contamination, and also to reduce first stage flow to substantially zero when skid control action is not required.

Another object of the invention is to provide a pressure control servo valve with an improved system response time because the second stage reacts faster to control pressure variations of the first stage because of the greater amount of fluid inlet pressure applied to the full area of the second stage.

Another object of the invention is to provide a pressure control servo valve which provides a constant control sensitivity at all inlet pressures as the valve controls pressure as the percentage relationship between inlet pressure and the desired brake pressure thereby making the valve sensitivity to electrical signals constant at all inlet pressures.

Another object of the invention is to provide a pressure control servo valve to control brake pressure which is sensitive, quick, and accurate in operation, as well as simple in construction and low in cost.

The aforesaid objects of the invention and other objects which will become apparent as the description proceeds are achieved by providing in a hydraulic pressure control servo valve for a brake the combination of a first stage variable orifice valve, a second stage variable orifice

2 valve, means to supply hydraulic fluid under pressure to the second stage variable orifice valve, capillary conduit means interconnecting the first and second stage variable orifice valves so that the second stage variable orifice valve acts as a slave to the position of the first stage variable orifice valve, positive means to control the position of the first stage variable orifice valve from full open to full closed, and means to regulate the hydraulic fluid under pressure from the second stage variable orifice valve at a pressure proportionate to the position of the first stage variable orifice valve.

For a better understanding of the invention reference should be had to the accompanying drawings, wherein.

While it should be understood that the invention can be used as a pressure control servo valve for any type of hydraulic pressure control system, or with any vehicular brake system, it is particularly adaptable for use with an anti-skid system for aircraft brakes, and hence it has been so illustrated and will be so described.

Figure 1:
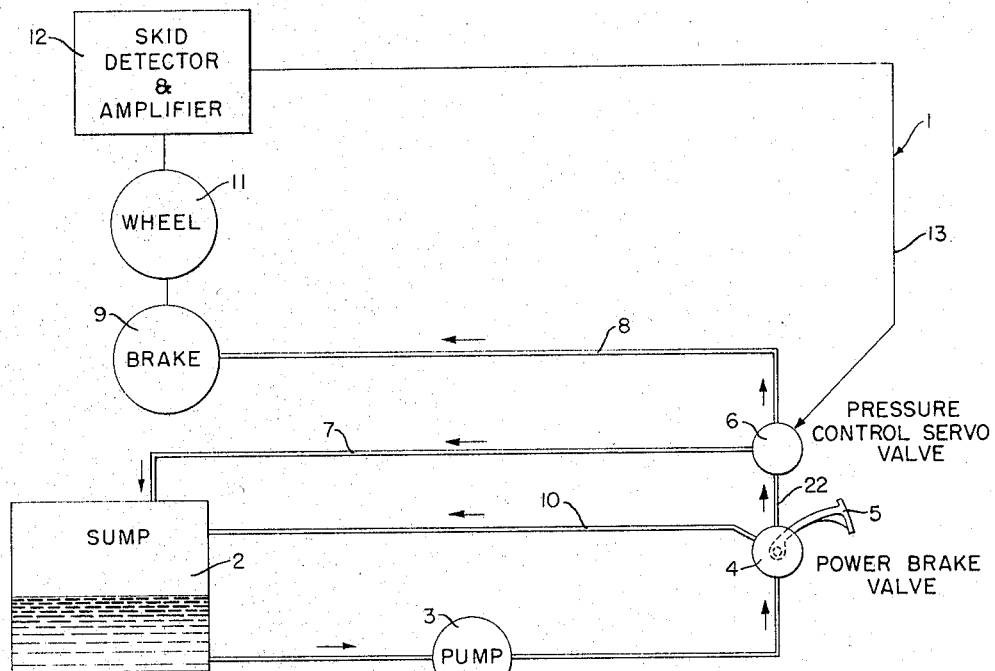
FIGURE 1 is a block schematic diagram of an aircraft braking system utilizing a pressure control servo valve proposed by the invention.

With reference to the form of the invention illustrated in the drawings, and particularly in FIGURE 1, the numeral 1 indicates generally an aircraft wheel anti-skid and braking system, comprising one embodiment of the invention. The system 1 includes a hydraulic fluid sump 2 connecting to a pump 3 which provides hydraulic fluid under pressure to a power brake valve 4, generally controlled by a foot pedal 5 which may be operated by an aircraft pilot. The power brake valve 4 regulates the amount of fluid under pressure passing therethrough dependent upon the position of the pedal 5. The hydraulic fluid under pressure is then directed to a pressure control servo valve 6, which comprises the invention, with the servo valve 6 adaptable to direct the hydraulic fluid under pressure via a conduit 7 back to the sump 2 or via a conduit 8 to a brake unit 9. Conduit 10 extends from valve 4 to sump 2. The brake 9 is operatively connected to an aircraft wheel 11, which wheel 11 drives a skid detector and amplifier 12. The electrical output from the skid detector and amplifier 12 is directed as an input control to the pressure control servo valve 6 via the line 13.

Thus, to broadly understand the purpose of the pressure control servo valve 6, it can be said that the valve 6 merely regulates hydraulic pressure from the power brake valve 4 to the brake unit 9 as deemed proper by the electrical signal from the skid detector and amplifier. Thus the pressure control servo valve 6 acts as a two way, three position gate which may reduce brake pressure by opening brake to return, increase brake pressure by opening inlet pressure to brake, or hold a given pressure by shutting off both brake and return lines.

Figure 2:
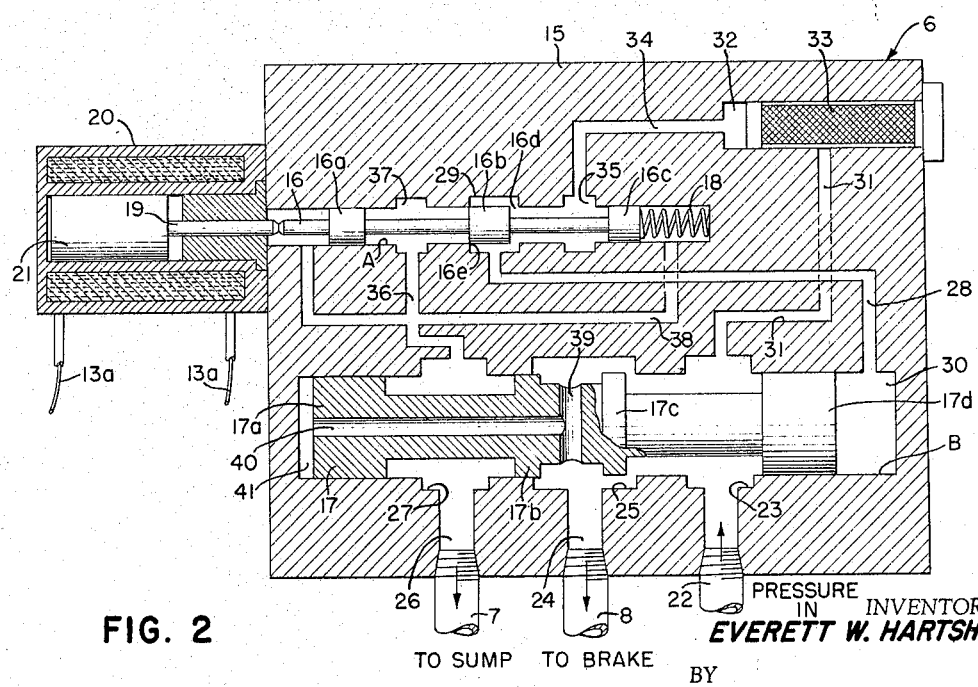
FIGURE 2 is a vertical cross sectional plan schematic view of one embodiment of the pressure control servo valve of the invention with the valve in a position of increasing brake pressure to full inlet pressure.
Figure 3:
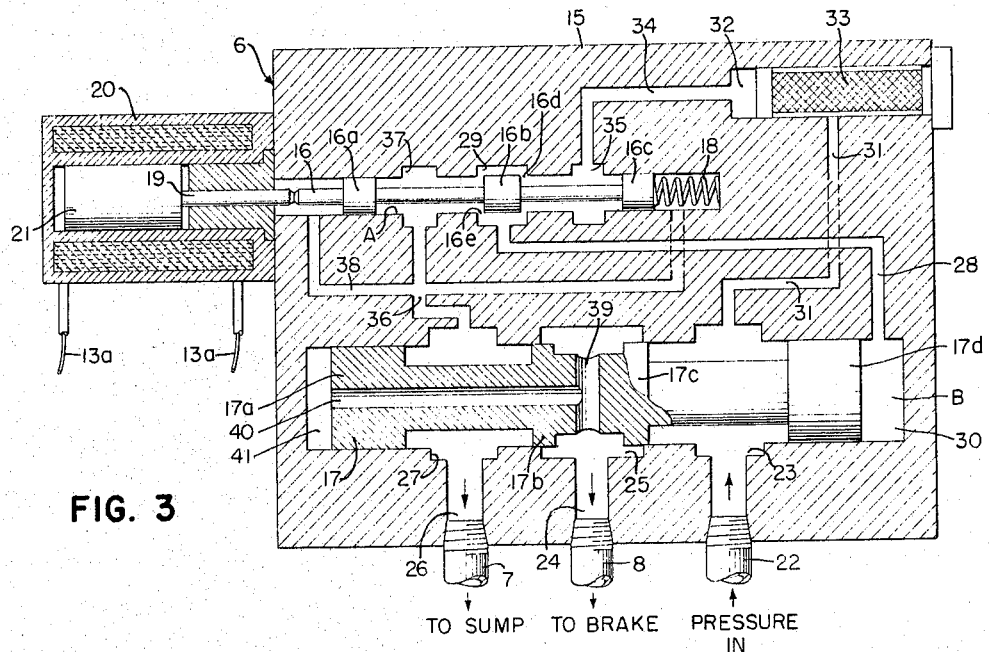
FIGURE 3 is a cross sectional view similar to FIGURE 2 with the valve in a position of holding a reduced brake pressure.
Figure 4:
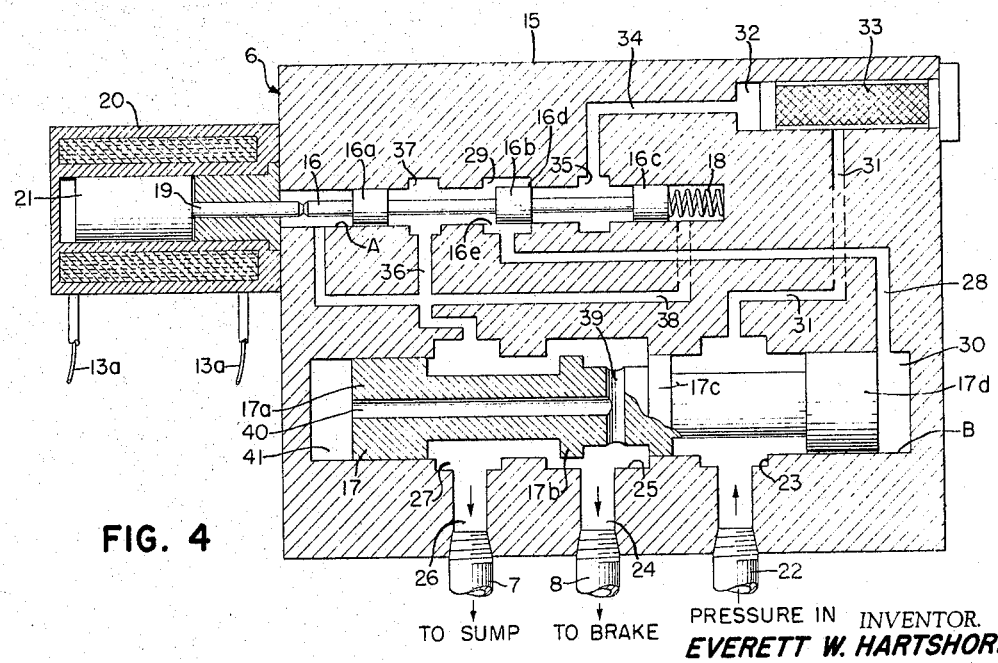
FIGURE 4 is a view similar to FIGURE 2 with the valve in the position of reducing brake pressure to zero.

In order to properly understand the operation of the pressure control servo valve 6, reference should be had to the schematic drawings in FIGURES 2 through 4. Particularly, with reference to FIGURE 2, the valve, indicated generally by numeral 6, comprises a housing 15 which for a pilot valve or a first stage variable orifice valve slidably mounts a first stage piston, indicated generally by numeral 16 in a cylinder A, and for a power valve or a second stage variable orifice valve a second stage piston indicated generally by numeral 17 in a cylinder B. The first stage piston 16 has three connected lands 16a through 16c, while the second stage piston 17 has four connected lands 17a through 17d, respectively.

The first stage piston 16 is operatively maintained in a desired position as it is biased at the end of the land 16c by means of a helical spring 18 and is engaged at the opposite end of the land 16a by a rod 19 of a solenoid, indicated generally by the numeral 20. A sliding armature 21 operatively secured to the rod 19 is controlled in its position within the solenoid 20 by the amount of current passed through a pair of actuating wires 13a. The actuating wires 13a actually receive their electrical input current from the skid detector and amplifier 12 of FIGURE 1.

The first stage piston 16 actually operates as a double orifice valve. Namely, the central land 16b makes a sliding metal to metal contact at each end of its travel to provide one orifice at 16d on the right and another at 16e on the left. Likewise, the second stage lands 17b and 17c on the piston 17 engaging the walls of the cylinder B on either side of an enlarged opening 25 acts as a double orifice valve, although both sides will never be open at the same time.

Hydraulic fluid under pressure, is introduced into the valve 6 through an inlet conduit 22 connecting into an enlarged portion 23 of the cylinder B substantially between the lands 17c and 17d on the second stage piston 17. The conduit 22 is connected to power brake valve 4 in FIGURE 1. Hydraulic fluid under pressure is directed towards brake 9 by conduit 8 from brake port 24 which connects to an enlarged portion 25 of the cylinder B substantially between the lands 17b and 17c of the second stage piston 17. In order to provide a return of excess or undesired fluid under pressure, such as to the sump 2 via the line 7 of FIGURE 1, a return port 26 connects to an enlarged portion 27 of the cylinder B substantially between the lands 17a and 17b of the second stage piston 17.

The second stage piston 17 is designed to operate as a slave to the first stage piston 16. In order to accomplish this purpose, a plurality of interconnecting capillary sized conduits or passages are provided between the cylinders A and B mounting the pistons 16 and 17. Thus, a passage 28 connects an enlarged portion 29 of the cylinder A substantially receiving the central land 16b of of the first stage piston 16 to an end chamber 30 of the cylinder B adjacent the end land 17d on the second stage piston 17. A passage 31 connects the enlarged portion 23 between the lands 17c and 17d of the second stage piston 17 to a first stage oil filter chamber 32. The oil filter chamber 32 operatively receives and mounts a first stage oil filter 33. A passage 34 operatively connects with the end of the oil filter chamber 32 and an enlarged portion 35 of the cylinder A substantially between the central land 16b and the end land 16c of the first stage piston 16. A passage 36 operatively connects the enlarged portion 27 between the land 17a and land 17b of the second stage piston 17 to an enlarged portion 37 of the cylinder A substantially between the end land 16a and central land 16b of the first stage piston 16. In order to equalize hydraulic fluid pressure on each end of the first stage piston 16, an equalizing passage 38 connecting to the passage 36 is provided which insures that equal and opposite pressures will be directed on the ends of the lands 16a and 16c to thus cancel any tendency for the hydraulic fluid under pressure to actuate the first stage piston in any way. It becomes apparent that because of the equalizing passage 38, the only force available to move and adjust the longitudinal relation of the first stage piston 16 is that supplied by the solenoid 20. And further, it should be understood that the solenoid 20 operating through the plunger 19 works against the bias exerted by the helical spring 18.

In FIGURE 2, the valve 6 is shown in the de-energized condition. In other words, there is no electrical current passing through the lines 13a to actuate the solenoid 20. Thus, the armature 21 is in the far left or de-energized position so that the spring 18 effects a bias which has moved the first stage piston 16 as far to the left as possible to completely open orifice 16d and completely close orifice 16e. In this situation, if a hydraulic fluid under pressure is supplied through the inlet conduit 22, the fluid will pass through the passage 31, the oil filter 33, the passage 34 and into the enlarged portion 35, thence into the enlarged portion 29, through the orifice 16d, back through the passage 28 and into the end chamber 30 to provide a pressure on the end of the land 17d to slide the second stage piston into a left position, as indicated. Normally, the piston 17 rides in a central null position, (FIG. 3). The above mentioned movements happen almost instantaneously upon the first application of hydraulic fluid under pressure through the inlet 22.

As soon as the second stage piston 17 moves to the left, as indicated, the hydraulic fluid under pressure will be able to pass into the enlarged portion 25, or around the land 17c and through the outlet or brake port 24 to be directed to conduit 8 and brake 9. As the pressure directed through the outlet port 24 to the brake 9 builds up to equal the input pressure through the conduit 22, it passes into a passage 39 in the second stage piston 17 between the lands 17b and 17c, and thence through a passage 40 to be directed to an end chamber 41 of the cylinder B adjacent the end of the land 17a. Thus, the pressure in the end chamber 41 will soon become nearly equal to and opposite the pressure in the end chamber 30 and the second stage piston 17 will become in a state of equilibrium as the fluid input pressure through the inlet conduit 22 equals the cylinder output pressure through the outlet port 24. It should be noted that the only hydraulic fluid flow through the first stage piston 16 is that which initially passes through the passage 31 and the orifice 16d to eventually end up in the end chamber 30 adjacent the end of the land 17d, as explained above.

Since the drawings are the same, similar numerals to those used on FIGURE 2, are used on similar parts of FIGURES 3 and 4. FIGURE 3 represents the valve 6 where the input current through the wires 13a is enough for the solenoid 20 to force the armature 21 about ½ of its travel to the right so that the first stage piston 16 has moved land 16b so as to start closing the orifice 16d and more fully restrict the flow of hydraulic fluid input, and also to start opening the orifice 16e to direct fluid pressure into the enlarged portion 37 to pass through line 36, to enlarged portion 27 and out return port 26 and conduit 7 to the sump. Also, the reduction in pressure occasioned by the opening of the return line, immediately reduces the pressure in the end chamber 30 to the right of land 17d so that the second stage piston 17 will immediately slide half way to the right, as shown in FIGURE 3, and thereby seal off the input pressure by means of land 17c. As soon as the pressure in chamber 41 is reduced to the pressure in chamber 30, the forces on the second stage piston 17 are balanced and it reaches a position of equilibrium or null as shown thereby shutting off flow into or out of passage 24 which maintains the preset pressure established by the first stage. Movement of the first stage piston 16 to a central or null position maintains the same pressure on the brake 9.

FIGURE 4 illustrates the result when the current through the wires 13a causes the solenoid 20 to completely depress the armature 21 to effect movement of the first stage piston 16 as far to the right against the bias pressure of the spring 18 as possible. When this happens it can be seen that the central land 16b seals off the input orifice 16d into the enlarged portion 29 thereby completely stopping the flow of hydraulic pressure through the line 28 to the end chamber 30. Any pressure remaining in line 28 passes through the return orifice 16e into the enlarged portion 37, the passage 36, the enlarged portion 27 and out the return passage 26 to sump 2. Thus, in this position, it is quite evident, that there will be no hydraulic fluid under pressure introduced through the inlet 22 which passes through the outlet 24 to conduit 8 and brake 9. In this situation, the second stage piston 17 will move to the right opening up brake port 24 to return port 26.

Thus, it is seen that the position of the first stage piston 16 as controlled by the solenoid 20, which solenoid is controlled by the input current through the line 13a received from an anti-skid unit, accurately, quickly and effectively controls the amount of hydraulic fluid under pressure introduced through the inlet conduit 22 which passes through the outlet or brake port 24 to the brake. The orifices 16d and 16e on each side of the enlarged portion 29 are opened or closed by the central land 16b on the first stage piston 16 and this construction allows fluid flow therearound and makes the orifices self cleaning by nature. The helical spring 18 which may be carefully calibrated, determines the amount of movement of the first stage piston 16 so that the input current to the solenoid 20 will only cause pressure changes as determined by the amount of bias exerted by the spring 18. By means of the balancing line 38, the fluid pressures exerted on the first stage piston 16 are equalized, so that only the solenoid 20 and the spring 18 control the movement thereof.

It should be also understood that any pressure changes through the inlet conduit 22 will immediately be transferred to the outlet or brake 24 because of the unbalance which this sets up. As stated previously, normally the second stage piston 17 rides in the null position, or that indicated in FIGURE 3. Thus, with a decrease in the inlet pressure, the second stage piston is unbalanced and moves to the right, opening up the return port 26 and allowing excess pressure to pass therethrough. When the pressure to the brake through the port 24 drops down to equal the pressure through the inlet conduit 22, the second stage piston 17 will move back to the null position as stated previously, and as seen in FIGURE 3 the null position isolates the outlet port 24 from the return port 26 and the inlet conduit 22. On an increase in the pressure through the inlet conduit 22, the opposite occurs. Namely, the second stage piston 17 moves to the left, opening the way for the fluid pressure to pass into the enlarged opening 25 and to the outlet or brake port 24, and this occurs until the pressure to the brake equals the inlet pressure, and the second stage piston 17 again moves back to the null position.

Therefore, it is seen under control of valve 4 that the valve 6 provides a desired amount of fluid under pressure to a brake for a given fluid input pressure by the positioning of the first stage piston 16 with the solenoid 20. Likewise, the second stage piston 17 slides back and forth upon selected changes in input pressure through the inlet conduit 22 so as to maintain a definite proportionate output pressure through the outlet port 24 to brake 9. It should be understood that all these movements and fluctuations occur very quickly to adjust to the selected pressures.

Since the control of the orifices 16d and 16e opened and closed by the center land 16b of the first stage piston 16 are quite critical in dimension and contact with the land 16b, it should be noted that all oil flow through the orifices is filtered through the first stage oil filter 33. Likewise, it should be evident that oil flow through the orifice 16d will be a minimum or almost zero when the solenoid 20 is not energized, as indicated in FIGURE 2, and that the oil flow will gradually increase as the first stage piston 16 is moved to the right as actuated by the solenoid 20 until a maximum oil flow is reached when the central land 16b is approximately centrally located between the orifices, as shown in FIGURE 3.

Thence, the oil flow will decrease again as the piston 16b moves clear to the right to close off the inlet orifice 16d. In this manner, oil flow through the first stage piston is maintained at an absolute minimum except when control pressure change is required thereby insuring maximum oil flow and quick response through the second stage piston 17 and to the brake or sump as desired. This insures that substantially full inlet pressures are used for driving the second stage piston. It has been shown in testing that this produces a driving force 8 to 10 times greater than on the usual control valves.

The above described system improves overall valve response time as this time is the summation of valve response time, valve pressure drop, and the pressure "rounding" characteristics of the valve as it approaches a reduced setting. Due to a high control force developed by using the full area of the second stage piston 17 because of the reduced pressure drop of the second stage piston, the overall system response time is greatly improved.

Also, as pointed out above, constant control sensitivity at all inlet pressures is provided by the second stage piston 17, and this is regardless of the setting of the first stage piston 16. However, the desirable effect of the valve is its absolute control by the sensitivity to electrical signals from an anti-skid unit. It should be understood that the pressure flow in this system is inversely proportional to the amount of current passed through the lines 13a, or is inversely proportional to the amount of movement effected by the solenoid 20. It should be understood that the valve could be made directly proportional by a reversal of the passages 34 and 36 in their connection to the enlarged portions 35 and 37.

Thus, it is seen that a pressure control servo valve has been provided which is quite simple in construction, yet extremely sensitive, accurate and responsive in operation, and which accomplishes the objectives of the invention set forth heretofore.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. A pressure control valve including
   a housing,
   a brake line, a pressure line, and a sump line connected to the housing,
   a power valve means in the housing having a central null position isolating all lines and movable in one direction to a pressure position connecting the pressure and brake lines, and movable in the opposite direction to a discharge position to connect the brake and sump lines,
   a first pressure chamber at one end of the power valve means and connected to the pressure line and tending to move the power valve means to pressure position,
   a second pressure chamber at the other end of the power valve means and connected to the brake line and tending to move the power valve means to discharge position,
   pilot valve means in the housing connected to the first pressure chamber and movable from a closed position holding pressure in the first chamber to an open position discharging pressure from the first chamber to the sump line,
   spring means normally closing the pilot valve, and
   solenoid means for opening the pilot valve.

2. The combination according to claim 1 wherein mechanism is provided in the pilot valve means for closing off the pressure line when the pilot valve means is opened.

3. The combination according to claim 1 wherein conduit means are provided for connecting the first pressure chamber to the pressure line.

4. The combination according to claim 1 wherein conduit means are provided for connecting the second pressure chamber with the sump line when the power valve means are in discharge position.

5. The combination according to claim 1 wherein the brake line is positioned between the sump line and the pressure line with the power valve means alternately connecting the pressure line with the brake line and the brake line with the sump line in short, large flow paths.

6. The combination according to claim 1 wherein the pressure flow through said power valve means is substantially greater than the pressure flow through said pilot valve means throughout the full range of pressure control.

7. The combination according to claim 1 whereby conduit means are provided for connecting the second pressure chamber with the brake line wherein the movement of the power valve means from the null position to the discharge position relieves the pressure in the brake line by storing fluid from the brake line in said second pressure chamber.

8. A pressure control valve including
   a housing,
   a brake line, a pressure line, and a sump line connected to the housing,
   a power valve means in the housing having a null position isolating all lines and movable in one direction to a pressure position connecting the pressure and brake lines, and movable in the opposite direction to a discharge position to connect the brake and sump lines,
   a first pressure chamber at one end of the power valve means and connected to the pressure line and tending to move the power valve means to pressure position,
   a second pressure chamber at the other end of the power valve means and connected to the brake line and tending to move the power valve means to discharge position,
   pilot valve means in the housing connected to the first pressure chamber and movable from a closed position holding pressure in the first chamber to an open position discharging pressure from the first chamber to the sump line,
   spring means normally closing the pilot valve, and
   means for opening the pilot valve.

References Cited by the Examiner

UNITED STATES PATENTS

| | | | |
|---|---|---|---|
| 2,953,123 | 9/1960 | Reen et al. | 137—625.24 X |
| 3,027,123 | 3/1962 | Westcott | 303—21 X |
| 3,131,975 | 5/1964 | Smith et al. | 303—21 |

EUGENE G. BOTZ, *Primary Examiner.*